2 Sheets--Sheet 1.

W. McLUCAS.
Grape-Mills.

No. 157,923.

Patented Dec. 22, 1874.

Witnesses.
Edwin James.
Horace Brown

Inventor.
William McLucas.
per J. E. F. Holmead
Attorney

2 Sheets--Sheet 2.

W. McLUCAS.
Grape-Mills.

No. 157,923. Patented Dec. 22, 1874.

Witnesses.
Edwin James
Horace Brown

Inventor.
William McLucas.
per J. E. J. Holmead
Attorney.

UNITED STATES PATENT OFFICE.

WILLIAM McLUCAS, OF WATERFORD, OHIO.

IMPROVEMENT IN GRAPE-MILLS.

Specification forming part of Letters Patent No. 157,923, dated December 22, 1874; application filed August 5, 1874.

*To all whom it may concern:*

Be it known that I, WILLIAM McLUCAS, of Waterford, in the county of Washington and State of Ohio, have invented an Improved Grape Grinder or Crusher, of which the following is a full, clear, and exact description, reference being had to the accompanying drawing and the letters of reference marked thereon, making part of this specification, in which—

Figure 1:
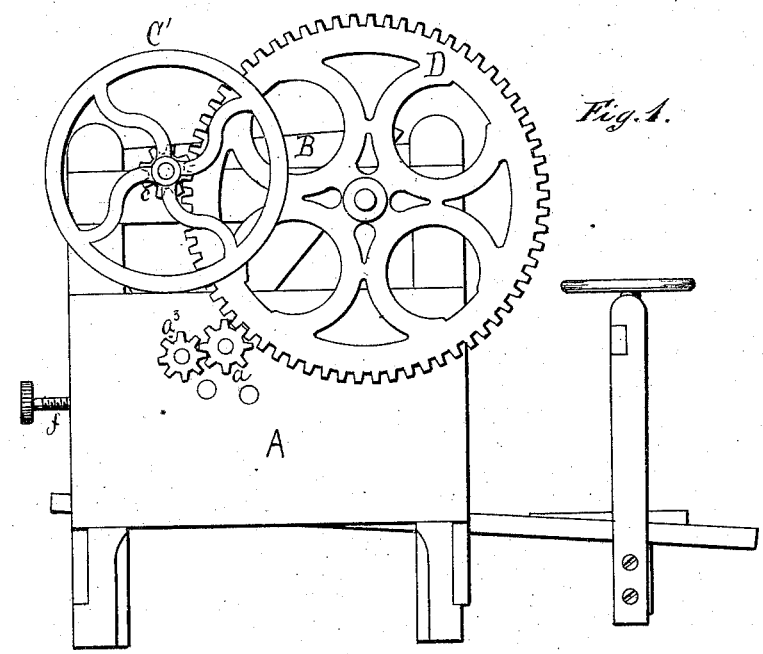
Figure 2:
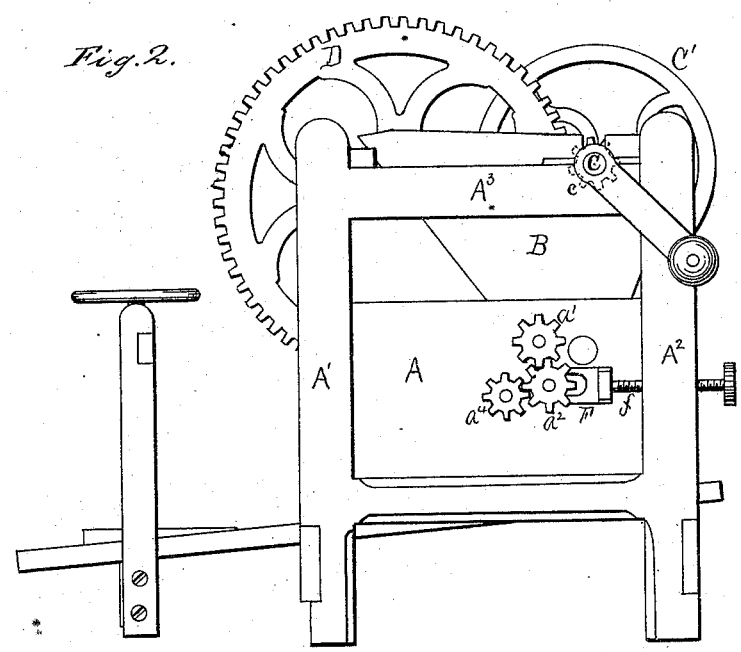
Figure 3:
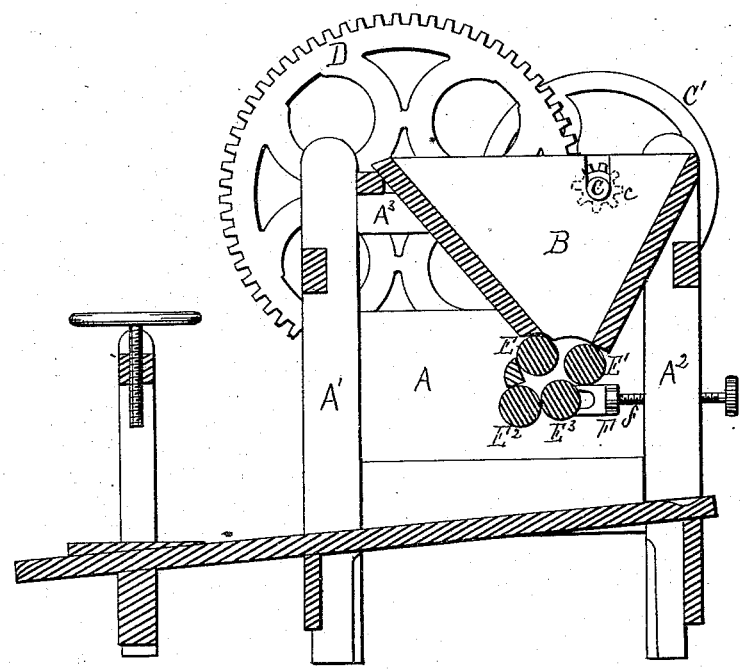

Figure 1 is a view of one side of the machine. Fig. 2 is a view of the other side of the machine. Fig. 3 is a longitudinal sectional view.

The object of my invention is the production of a machine for grinding or crushing grapes in such manner that the spongy substance which grows around the seed shall be removed without breaking the same. By this means the pomace is freed from that bitter taste (the result of the broken seed) and the wine becomes purer than that at present produced.

The nature of my invention consists in journaling in the side of the machine, and immediately below the hopper, four gum rollers. On the axles of these rollers are secured pinions, which mesh with gear-wheels journaled to the sides of the machine. The pinions on the two upper rollers are so arranged that these rollers shall both revolve inwardly, and thus cause the grape to be drawn in.

The construction and operation of my invention are as follows:

A is the frame-work of the machine, which is composed of four uprights, $A^1$ $A^1$ $A^2$ $A^2$, connected together by upper cross-timbers, $A^3$ $A^3$, and lower cross-timbers and side timbers. B is the hopper, which is located within the uprights $A^1$ $A^1$ $A^2$ $A^2$, and sustained in place by means of the side timbers of the frame-work. On the front section of the cross-timbers $A^3$ $A^3$ is journaled the driving-shaft C, on one end of which is fastened a crank, while on the opposite end is fastened a wheel, C'. On this shaft C, and immediately inside of the wheel C', is fastened a pinion, $c$. To the rear section of the cross-timber $A^3$, and on the same side of the machine upon which the wheel C' and its pinion $c$ is located, is journaled a cog-wheel, D. This cog-wheel meshes with the pinion $c$. Immediately below the hopper B, and journaled in the side timbers of the frame-work A, are the rollers E $E^1$ $E^2$ $E^3$. These rollers are made of gum, or other suitable soft material. The object of constructing them of gum is that the seed shall press in the soft material, and not be broken when forming the pomace, and thus prevent the bitter taste which is given to the wine by the seed. The two upper rollers E $E^1$ are located a short distance apart, and are so geared that they will both revolve inwardly, and thus help to draw the grape in. On each end of the shaft that carries the roller E are fastened pinions $a$ $a^1$, the pinion $a$ meshing with the wheel D, while the pinion $a^1$ meshes with the pinion $a^2$, which is secured on the shaft that carries the roller $E^3$. On the shaft that carries the roller $E^1$ is secured a pinion, $a^3$, which meshes with the pinion $a$, while on the shaft which carries the roller $E^2$ is secured a pinion, $a^4$, which meshes with the pinion $a^2$. From this arrangement of gear and pinion wheels motion is imparted to the rollers. Each of these rollers may be provided with cleaners made of tin or sheet iron. The bottom timber of the press is formed with a groove or gutter, by means of which the pomace is drawn off. In the uprights $A^2$ $A^2$, and opposite the pinion $a^2$ and the roller $E^3$, are located brakes F F, for the purpose of preventing the machine from operating when desired. These brakes are operated by means of the screw-handles $f$ $f$.

What I claim as new, and desire to secure by Letters Patent of the United States, is—

The combination, in a grape-press, of the hopper B, gum rollers E $E^1$ $E^2$ $E^3$, pinions $c$ $a$ $a^1$ $a^2$ $a^3$, cog-wheel D, and brakes F F, the whole to operate substantially as described.

In testimony whereof I have signed my name to this specification in the presence of two subscribing witnesses.

WILLIAM McLUCAS.

Witnesses:
J. G. WOOD,
J. C. PRESTON.